United States Patent
Weinberger

[15] 3,703,051
[45] Nov. 21, 1972

[54] METHODS FOR IMPROVING THE GROWTH CHARACTERISTICS OF PLANT MATERIAL SUCH AS SEEDS AND GROWING PLANTS

[72] Inventor: Pearl Weinberger, 290 Buena Vista Road, Ottawa, Ontario, Canada

[22] Filed: July 29, 1971

[21] Appl. No.: 167,444

Related U.S. Application Data

[63] Continuation-in-part of Ser. No. 808,260, March 18, 1969, abandoned.

[52] U.S. Cl. ..............................47/58, 47/DIG. 12
[51] Int. Cl. ...........................................A01c 1/00
[58] Field of Search ..................47/DIG. 12, 58, 1–3

[56] References Cited

UNITED STATES PATENTS

| | | | |
|---|---|---|---|
| 2,745,789 | 5/1956 | Specht | 47/DIG. 12 |
| 3,382,846 | 5/1968 | Roncari et al. | 47/58 X |
| 3,499,436 | 3/1970 | Balamuth | 47/1.3 X |
| 3,499,437 | 3/1970 | Balamuth | 47/1.3 X |

FOREIGN PATENTS OR APPLICATIONS

| | | |
|---|---|---|
| 868,795 | 2/1953 | Germany |
| 886,396 | 8/1953 | Germany |
| 8,604 | 3/1970 | Japan |

OTHER PUBLICATIONS

The Use of Ultrasonic Energy in Agriculture, Campbell et al., Ag. Engineering, May 1949, page 240.
The Effect of . . ., einberger et al., Canadian Journ. of Bot. 1968, pp. 1151–158.

*Primary Examiner*—Robert E. Bagwill
*Attorney*—Watson, Cole, Grindle & Watson

[57] ABSTRACT

The growth characteristics of plant material such as seeds and growing plants are improved by means of subjecting the material to vibrations of predetermined frequencies. Chilling is required for seeds exposed to audible frequencies although the chilling is optional when the seeds are exposed to higher frequencies. Also, the seeds must be imbibed to a certain extent when subjected to audible frequencies, the extent of imbibition being controlled through the agency of physical or physiological limitations. In the audible range, the seeds are exposed for a minimal optimal period of four weeks. Seeds exposed to ultrasound frequencies may be, however, air dry and are exposed in such range for at least several seconds.

4 Claims, No Drawings

METHODS FOR IMPROVING THE GROWTH CHARACTERISTICS OF PLANT MATERIAL SUCH AS SEEDS AND GROWING PLANTS

This application is a Continuation-in-Part of U.S. Pat. Application Ser. No. 808,260, filed March 18, 1969, and now abandoned.

The present invention relates generally to methods for improving the growth characteristics of plant material such as seeds and growing plants and, more particularly, contemplates the treatment of seeds and of growing plants by means of stimulation, such as stimulation resulting from sound waves in both the audible and the ultra-sound ranges, whereby certain changes are brought about in such plant material including the improvement of growth characteristics.

It is a principal object of the present invention to treat plant material under the influence of either audible sound or ultra-sound waves in order to affect the vegetative and sometimes the reproductive growth characteristics of the same. Early development work in connection with this invention is described in the 1968 Canadian Journal of Botany, Vol. 46, pages 1,151 through 1,158, and in the 1969 Canadian Journal of Botany, Vol. 48, pages 659 – 662.

Another object of the present invention is to chill such plant material while under the influence of the audible sound waves while soaking or imbibing the material to a certain extent. The material is exposed to frequencies in the audible range for a minimum optimal period of four weeks.

A further object of this invention is to effect an improvement in the growth characteristics of the plant material while under the influence of ultra-sound waves in which case the material may be air dry and may be exposed to the ultra-sound frequencies for at least several seconds.

Basically, the present invention is directed to techniques for improving the growth characteristics of plant material wherein the material is exposed to either audible sound waves or to vibrations in the ultra-sound range.

The effect of audible sound in the 5 kc/s *(* kc/s = kHz, c/s = Hz) and 12 kc/s ranges on the germination and growth of grains and seedlings of vernalized spring (Marquis) and winter (Rideau) wheats was investigated. The germination study series consisted of a control group, C, not sound treated, and two groups, 5K and 12K, exposed to sound of frequency 5 kc/s and 12 kc/s, respectively. Each group was held at three temperatures, 25°, 10° and 2°C, requiring a total of nine cabinets. In each cabinet were placed five blackened petri dishes, filter-paper lines, each containing ten medium-sized morphologically comparable grains to which excess water was added (7.5 ml per 8.5-cm diam. petri dish).

In the 5K and 12K groups, the sound was transmitted to the cabinets by a four-inch loudspeaker mounted inside, and in the middle of the rear wall. Each speaker was driven via an impedance matching transformer by the full output of an audio-oscillator located outside the cabinet. The sound pressure level was monitored at various places in the cabinet by a meter.

The same pressure level at the petri dishes was 95 db re 0.0002 dyne/cm$^2$ at 12 kc/s, and 92 db re 0.0002 dyne/cm$^2$ at 5 kc/s, and varied by less than ±1 db over the various positions of the petri dishes. General background noise (from machinery) was 45 db in all cabinets, but contributions from noise at 5 and 12 kc/s were negligible.

The number of grains germinated was observed at hourly intervals for grains held at 25°, every four hours at 10° and every 12 hours on the grains at 2°C. Germination was assessed to be complete when the radicle just pierced the grain coat.

The set of nine growth conditions described above was repeated at three different times during a 15-month period. In each such repetition, cabinets were systematically interchanged so that control cabinets became 5 kc/s or 12 kc/s cabinets and vice versa. The cabinets assigned to different temperatures were also interchanged during one replication.

During the growth studies, the grains (10 per blackened petri dish) were first allowed to imbibe at 24 ±1°C for 6 hours, and were then divided into three groups which were chilled at 2°C until vernalization was completed (1 week for Marquis, 4 weeks for Rideau wheat). During chilling one group was not exposed to sound, the other two were exposed to 5 kc/s and 12 kc/s respectively. After vernalization, the sound-treated groups were each divided into two sets. With one of the sets the same treatment was continued during the subsequent growth period, while the other was transferred to control cabinets and not exposed to sound. Using a two symbol notation to describe the conditions during vernalization and growth, respectively, the four resultant sets are represented by 5K,5K; 5K,C; 12K,12K; and 12K,C. The vernalized, but sound-unexposed group was split into three sets, two of which were sound treated during the growth period, giving the sets represented by C,C; C,5K; and C,12K. Each of the final sets consisted of 5 petri dishes with 10 young seedlings per dish.

When the seedling roots reached a length of 3 cm, two seedlings were randomly selected from each petri dish and singly transferred to blackened polyethylene bottles containing a culture medium (Hoagland solution, one-fourth strength). The original sample of 50 grains per growth condition, now reduced to 10 seedlings per treatment, was analyzed after the selected growth period with respect to the following parameters: plant height, number of roots, fresh and dry weights of total root system, fresh and dry weight of "tops".

Growth periods chosen were 1, 2, 4, 6 and 8 weeks. For each growth period a complete set of the combinations of vernalization and growth conditions was required.

To reduce the number of cabinets, various samples undergoing the same treatment at a particular time were often housed together.

The culture medium was changed twice weekly initially, and subsequently three or four times weekly as warranted by plant growth. A regime of a 16-hour day and 8-hour night was maintained in all cabinets. The total light intensity during the daytime period was 1,500–1,750 ft-c provided by four 25-watt incandescent, and eight fluorescent lights.

Dry weights were obtained after the plant material was heated at 95 ±1°C for 24 hours and then equilibrated with atmospheric humidity.

Each of the above experiments C,C; C,5K; C,12K; 5K,C; 5K,5K; 12K,C; 12K,12K was repeated three times for Rideau wheat and five times for Marquis wheat, at all the growth periods stated. In addition, systematic cabinet interchanges were made between replications, as described for the germination studies.

The data were subjected to statistical analysis using Scheffe's test at the 5 percent level.

The percentage germination was plotted against time. At each temperature the time was deduced at which the divergence between the curves for the sound-treated and control groups was largest. The results are shown in Table I for Marquis and Rideau wheat. Both wheat varieties appear to show the greatest divergence between sound-treated and control samples at the same times, although for Rideau wheat the divergences are not statistically significant.

TABLE I

| Temp., °C | Time | % germination | | |
|---|---|---|---|---|
| | Marquis Wheat | | | |
| 2 | 6 days | 5K | 12K | C |
| | | 84 | 82 | 24 |
| 10 | 3 days | 12K | 5K | C |
| | | 98 | 64 | 50 |
| 25 | 14 hours | 5K | 12K | C |
| | | 64 | 49 | 45 |
| | Rideau Wheat | | | |
| 2 | 6 days | 5K | C | 12K |
| | | 94 | 72 | 50 |
| 10 | 3 days | 12K | C | 5K |
| | | 100 | 98 | 96 |
| 25 | 14 hours | 5K | C | 12K |
| | | 90 | 90 | 84 |

With Marquis wheat, the effect of sound was temperature dependent. At 2° a larger percentage of Marquis seeds had germinated after 6 days, when exposed to either 5 kc/s or 12 kc/s sound, then when left under control conditions. At 10° only seeds kept under 12 kc/s germinated faster than controls, whereas at 25°C there were no significant differences between treatments.

Rideau grain, on the other hand, did not show statistically significant differences in germination between treatments an any of the temperatures.

In all cases, 99.8 percent of the grains germinated when left for longer periods at each of the three temperatures.

TABLE III

Rideau wheat after 4 weeks growth (Scheffe's test at the 5% level)

| | | | | | | |
|---|---|---|---|---|---|---|
| Height, cm.: | | | | | | |
| 5K, 5K* | 5K, C | 12K,12K | C,5K | 12K, C | C, C | |
| 52.2 | 4.00 | 39.7 | 34.6 | 33.1 | 30.2 | |
| Number of roots: | | | | | | |
| 5K,5K | 5K, C | 12K, C | 12K, 12K | C, 5K | C, C | |
| 15.9 | 15.4 | 15.4 | 12.8 | 11.8 | 10.7 | |
| Fresh wt. roots, g.: | | | | | | |
| 5K,C | 5K, 5K | 12K, C | 12K, 12K | C, 5K | C, C | |
| 1.40 | 1.27 | 1.05 | 0.88 | 0.69 | 0.44 | |
| Dry wt. roots, g.: | | | | | | |
| 5K, C | 5K, 5K | 12K,12K | 12K, C | C, 5K | C, C | |
| 0.10 | 0.08 | 0.07 | 0.07 | 0.04 | 0.03 | |
| Fresh wt. tops, g.: | | | | | | |
| 5K, 5K | 5K, C | 12K,12K | 12K, C | C, 5K | C, C | |
| 3.17 | 2.80 | 1.67 | 1.62 | 1.38 | 0.90 | |
| Dry wt. tops, g.: | | | | | | |
| 5K, 5K | 5K, C | 12K,12K | 12K, C | C, 5K | C, C | |
| 0.41 | 0.36 | 0.22 | 0.22 | 0.16 | 0.13 | |

*Treatment.

NOTE.—C, 12K data not included because of wide spread of values for all parameters.

Compared with the controls (C,C) the different responses of Marquis and Rideau wheats exposed to sound did not become evident till after 4 weeks of growth, and the data taken at earlier times are therefore not given. Table II shows the parameters for Marquis wheat, grown for 4 weeks. The C,12K treatment evoked a depressed growth response which was clearly significant in the decreased number of roots and depressed levels of fresh and dry weights. Other treatments were barely significant, except 12K,12K where there was a slight stimulation of the fresh and dry weights of tops.

TABLE II

Marquis wheat after 4 weeks growth (Scheffe's test at the 5% level)

| | | | | | | |
|---|---|---|---|---|---|---|
| Height, cm.: | | | | | | |
| 12K, 12K* | C, 5K | 5K, C | 4K, 5K | 12K, C | C, C | C, 12K |
| 48.8 | 46.9 | 46.0 | 45.2 | 42.1 | 41.8 | 41.6 |
| Number of roots: | | | | | | |
| 5K, 5K | 12K,12K | C,5K | 5K, C | C, C | 12K, C | C,12K |
| 27.5 | 27.4 | 24.8 | 24.3 | 22.9 | 20.1 | 16.0 |
| Fresh wt. of roots, g.: | | | | | | |
| 12K,12K | C,5K | 5K,5K | 5K, C | C, C | 12K, C | C,12K |
| 2.88 | 2.85 | 2.70 | 2.62 | 2.45 | 2.28 | 1.24 |
| Dry wt. of roots, g.: | | | | | | |
| 12K, 12K | 5K,5K | C,5K | C, C | 12K, C | 5K, C | C,12K |
| 0.21 | 0.18 | 0.18 | 0.17 | 0.15 | 0.15 | 0.08 |
| Fresh wt. top, g.: | | | | | | |
| 12K, 12K | 5K,5K | C,5K | 5K, C | 12K, C | C, C | C, 21K |
| 6.49 | 5.61 | 5.60 | 4.96 | 4.43 | 3.90 | 3.48 |
| Dry wt. tops, g.: | | | | | | |
| 12K, 12K | 5K,5K | C,5K | 5K, C | 12K, C | C, C | C,12K |
| 0.76 | 0.68 | 0.65 | 0.59 | 0.45 | 0.49 | 0.41 |

* Treatment.

In contrast, the results with Rideau wheat, shown in Table III, indicate that it was significantly stimulated by all sound treatments.

At the 6-week period many treatments adversely affected the growth of Marquis wheat (Table IV). A slight stimulation, significant only in the height of the plants and dry weight of the tops, was noted for the 5K,5K group. All Rideau wheat plants (Table V) grew more vigorously after continuous exposure to 5 kc/s. The weight of both roots and tops were increased by 250–300 percent over control in this treatment.

From the above, it appears that sound has a greater effect on the growth of Rideau wheat plants than on that of Marquis wheat plants, but a greater effect on the germination of the Marquis wheat. This suggests that at least two systems must be affected by these sound frequencies.

Neither the germination response to audible sound nor the different growth responses of the winter and spring wheats to the same sound levels can be explained at this point. It appears, however, that the effect of exposure to sound is transmitted to subsequent cell generations.

The amount of energy added by the sound frequencies in this experiment is very minute, being only one-billionth that required to break a chemical bond and is too low to cause cavitation of water. However, the amount of energy is sufficient to produce a resonance effect in any cellular organelle which has a natural period of vibration corresponding to that of the added sound. In such a case, the effects of individual successive vibrations of the sound waves would be cumulative and might induce larger vibrations of the organelle. This might, in some manner, affect cellular biochemical or biophysical processes which are connected with germination and growth. This then could account for the different responses between the two sound frequencies and between the two wheat varieties.

Another hypothesis involves the effects of sound on water. Since there is no thermal expansion of water at 4°C, a phase shift of the sound wave may occur at lower temperatures. If the rate of germination is not linear with regards to temperature and pressure, grains may germinate faster in one part of the sound wave than in another. If this is true, then temperature and pressure may re-enforce one another at 2°C, but not at 25°C. This then could account for increased germination rates of grains subjected to sound at 2°C but not at 25°C.

In a further study, two batches of 10 medium-sized Marquis grains per treatment were imbibed with excess water in petri dishes for 6 h at 25°C and then chilled in refrigerators at 2°C for 4 weeks. Four sound-exposed series (300 Hz, 1,250 Hz, 5 kHz, and 12 kHz), and one control series were chilled simultaneously. The 300 Hz and 1,250 Hz frequencies were obtained through 9-in. and 9.5 × 13 in. woofer speakers, respectively, and the 5 kHz and 12 KHz were obtained through 4-in. tweeter

TABLE IV (Marquis wheat after 6 weeks growth (Scheffe's test at the 5% level)

| Height, cm.: | | | | | | |
|---|---|---|---|---|---|---|
| 5K, 5K* | C, 5K | 5K, C | C, C | 12K, 12K | 12K, C | C, 12K |
| 60.1 | 56.8 | 55.3 | 51.6 | 50.3 | 47.0 | 46.1 |
| Number of roots: | | | | | | |
| 5K, 5K | C, C | C, 5K | 5K, C | C, 12K | 12K, 12K | 12K, C |
| 63.3 | 50.4 | 49.4 | 47.9 | 47.7 | 46.6 | 45.4 |
| Fresh wt. roots, g.: | | | | | | |
| 5K, 5K | C, C | %K, C | C, 5K | C, 12K | 12K, 12K | 12K, C |
| 5.20 | 4.83 | 4.53 | 3.91 | 3.89 | 3.72 | 3.62 |
| Dry wt. roots, g.: | | | | | | |
| 5K, 5K | C, C | 5K, C | C, 5K | C, 12K | 12K, C | 12K, 12K |
| 0.48 | 0.42 | 0.34 | 0.33 | 0.32 | 0.29 | 0.27 |
| Fresh wt. tops, g.: | | | | | | |
| 5K, 5K | C, C | 5K, C | C, 5K | C, 12K | 12K, 12K | 12K, C |
| 15.75 | 13.31 | 13.17 | 10.05 | 8.42 | 8.42 | 7.75 |
| Dry wt. tops, g.: | | | | | | |
| 5K, 5K | C, C | 5K, C | C, 5K | 12K, 12K | C, 12K | 12K, C |
| 2.35 | 1.79 | 1.56 | 1.50 | 1.25 | 1.22 | 1.08 |

*Treatment.

TABLE V

Rideau wheat after 6 weeks growth (Scheffe's test at the 5% level)

| Height, cm.: | | | | | |
|---|---|---|---|---|---|
| 5K, 5K* | 5K, C | C, 5K | C, C | 12K, 12K | C, 12K |
| 54.3 | 51.5 | 51.5 | 47.4 | 44.5 | 42.4 |
| Number of roots: | | | | | |
| 5K, 5K | 5K, C | 12K, 12K | C, 5K | C, 12K | C, C |
| 35.2 | 32.3 | 30.4 | 30.0 | 22.2 | 20.6 |
| Fresh wt. roots, g.: | | | | | |
| 5K, 5K | 5K, C | C, 5K | 5K, C | C, 12K | C, C |
| 3.90 | 3.32 | 2.94 | 2.54 | 1.69 | 1.44 |
| Dry wt. roots, g.: | | | | | |
| 5K, 5K | 5K, C | C, 5K | 12K, 12K | C, 12K | C, C |
| 0.28 | 0.24 | 0.20 | 0.20 | 0.13 | 0.09 |
| Fresh wt. tops, g.: | | | | | |
| 5K, 5K | 5K, C | C, 5K | 12K, 12K | C, C | C, 12K |
| 12.43 | 10.71 | 9.12 | 7.28 | 4.90 | 4001 |
| Dry wt. tops, g.: | | | | | |
| 5K, 5K | 5K, C | C, 5K | 12K, 12K | C, C | C, 12K |
| 1.51 | 1.32 | 1.07 | 0.92 | 0.64 | 0.60 |

*Treatment.

speakers attached to audiooscillators. The seeds were continuously exposed to the respective sound frequency throughout the chilling period. The sound pressure level, monitored with a precision sound pressure level meter was 95 db re 0.0002 dyne/cm$^2$ at 12 kc/s, 92 db at 5 kc/s, 89 db at 1,250 c/s, 93 db at 300 c/s.

After completion of the chilling period, the petri dishes were transferred to growth chambers where a 16-h day at 25°C 1 and 1,500 ft-c and an 8-h night at 18°C 1 were maintained. Seedlings were transferred to blackened polyethylene bottles containing one-fourth strength Hoagland solution when their roots reached 3 cm in length.

Plant height, number of tillers, number of roots, and the fresh and dry weights of both the root and shoot systems were measured after 8 weeks growth. Ten plants of each treatment were sampled. The experiment was repeated once, using growth cabinets other than those used in the initial experiment.

The data were subjected to statistical analysis using Scheffe's test at the 5 percent level.

After 8 weeks growth, Tables VI and VII, there was an indication that the three series 5K,5K; 12K,C; and 5K,C may have slightly stimulated the growth of Marquis plants. Continuing stimulation was seen in all treated Rideau plants after 8 weeks growth. Highly significant increments in the fresh and dry weights of roots and tops were obtained.

Table VIII shows the growth parameters for Marquis wheat after 8 weeks growth. Plants treated with 5 kc/s sound during the vernalization period (5K, C) were significantly larger than control plants (C, C), for all parameters examined. The height, dry weight of the roots, and fresh and dry weights of the tops of plants preheated with 300 c/s sound were also larger than controls. Plant growth was not significantly stimulated by treatment with either 1,250 c/s or 12kc/s sound frequencies.

For all parameters studied, the 5kc/s treatment produced the largest growth stimulation when compared with controls. Although no statistically significant differences were observed between the 5kc/s and 300 c/s treatments, grains treated with 5 kc/s sound consistently gave an indication of a more stimulated growth response.

The frequency-response curve of Marquis wheat appears to have at least two peaks, one at 300 c/s and one at 5 kc/s. The harmonic frequencies used here do not necessarily react in the same manner. The plant growth parameters examined were not significantly affected by treatment with 1,250 c/s sound, although all were enhanced by treatment with 5 kc/s, the fourth harmonic of 1,250 c/s.

The duration of the exposure period at specific developmental stages may also be important. In previ-

TABLE VI

Marquis wheat after 8 weeks growth (Scheffe's test at the 5% level)

| Height, cm.: | | | | | | | |
|---|---|---|---|---|---|---|---|
| 5K, 5K* | C, 12K | 5K, C | C, 5K | C, C | 12K, 12K | 12K, C |
| 72.8 | 70.8 | 67.7 | 67.1 | 62.7 | 62.0 | 61.3 |
| Numbers of roots: | | | | | | | |
| 5K, C | 12K, C | 5K, 5K | C, C | 12K, 12K | C, 12K | C, 5K |
| 105.6 | 101.4 | 98.9 | 89.8 | 89.2 | 85.4 | 84.7 |
| Fresh wt. roots, g.: | | | | | | | |
| 12K, C | 5K, C | 5K, 5K | C, C | C, 5K | 12K, 12K | C, 12K |
| 14.43 | 12.67 | 10.21 | 8.60 | 8.04 | 7.79 | 7.50 |
| Dry wt. roots, g.: | | | | | | | |
| 5K, C | 12K, C | 5K, 5K | C, C | C, 5K | 12K, 12K | C, 12K |
| 1.27 | 1.21 | 1.07 | 0.98 | 0.84 | 0.76 | 0.57 |
| Fresh wt. tops, g.: | | | | | | | |
| 5K, 5K | 5K, C | 12K, C | C, 5K | C, C | C, 12K | 12K, 12K |
| 31.55 | 30.08 | 29.36 | 25.73 | 25.18 | 23.13 | 18.68 |
| Dry wt. tops, g.: | | | | | | | |
| 5K, 5K | 5K, C | 12K, C | C, 12K | C, 5K | C, C | 12K, 12K |
| 5.90 | 5.30 | 4.90 | 4.37 | 4.13 | 4.03 | 3.45 |

* Treatment.

TABLE VII

Rideau wheat after 8 weeks growth (Scheffe's test at the 5% level)

| Height, cm.: | | | | | | | |
|---|---|---|---|---|---|---|---|
| C, 5K* | 5K, 5K | 5K, C | C, C | C, 12K | 12K, 12K | 12K, C |
| 61.0 | 60.3 | 57.2 | 57.1 | 55.4 | 55.1 | 55.0 |
| Number of roots: | | | | | | | |
| 5K, 5K | 12K, 12K | 5K, C | C, 5K | C, 12K | 12K, C | C, C |
| 71.0 | 67.8 | 66.8 | 55.1 | 54.1 | 53.2 | 36.0 |
| Fresh wt. roots, g.: | | | | | | | |
| C, 12K | 5K, 5K | C, 5K | 12K, 12K | 5K, C | 12K, C | C, C |
| 9.64 | 8.31 | 7.26 | 6.76 | 6.60 | 6.26 | 4.79 |
| Dry wt. roots, g.: | | | | | | | |
| C, 12K | 5K, 5K | 12K, 12K | 5K, C | C, 5K | 12K, C | C, C |
| 0.96 | 0.77 | 0.69 | 0.64 | 0.59 | 0.50 | 0.35 |
| Fresh wt. tops, g.: | | | | | | | |
| 5K, 5K | C, 5K | 5K, C | 12K, 12K | C, 12K | 12K, C | C, C |
| 29.24 | 23.79 | 23.72 | 21.11 | 21.04 | 18.68 | 15.27 |
| Dry wt. tops, g.: | | | | | | | |
| 5K, 5K | 5K, C | 12K, 12K | C, 12K | C, 5K | 12K, C | C, C |
| 4.50 | 3.73 | 3.31 | 3.14 | 3.03 | 2.60 | 1.85 |

* Treatment.

ous experiments, shown hereinabove, Marquis plants treated with 5 kHz sound for a total of 9 weeks, 1 week of vernalization and 8 weeks of subsequent growth, did not differ significantly from the control plants. In the present study, however, there was a 100 percent or greater increase in the fresh and dry weights of Marquis plants treated with 5 kHz sound during the prolonged 4-week imbibition in the cold.

Additional graph studies similar to the above, using the two-symbol notation to describe the conditions during vernalization and growth, were carried out for alfalfa and grasses. Batches of 500 g. of seeds of vernal alfalfa, frontier reed canary grass and Chinook orchard grass were placed into large, 50 cm × 66 cm plastic bags. The seeds were sprayed with a fine mist of distilled water equivalent to 12 percent of the dry weight of seeds.

Such a minimal moisture content serves to initiate a minimal fairly active metabolic state of the seeds which is necessary for them to respond to audio-sonication. This minimal moisture content may be described as treatment of the seed with a physical limitation imposed upon the amount of water which the seeds will be permitted to absorb. Alternatively, the water may be limited by some physiological means.

The bags were closed and the seeds allowed to imbibe the water at 25°C for 6 hours. Bags were then placed in either control refrigerators or in refrigerators to which either 5 kc/s or 12 kc/s sound was added. The bags were carefully placed so that the seeds formed as thin a layer as possible. During the 4-week chilling period at 2°C, the seeds were aerated daily by opening the bags and sifting through the seeds. Weights were checked weekly and adjusted to the 12 per cent added water level by the addition of distilled water in the form of a mist. When the chilling period was completed, the seeds were shipped and subsequently sown with water being applied as required throughout the growing season. Five rows of each treatment were hand-clipped, for 20 feet, after a 2-month growing period, whereafter the clippings were then carefully collected and weighed. The fresh weights of Chinook orchard grass, frontier reed canary grass, and vernal alfalfa, sound-treated and grown for two months in the field are shown in the following table:

TABLE VIII

Marquis wheat after 4 weeks chilling and 8 weeks growth (Scheffe's test at the 5% level)

| Height, cm.: | 300,C | 1,250,C | 12K,C | C,C |
|---|---|---|---|---|
| 5K,C | 55.5 | 50.9 | 49.5 | 49.2 |
| 57.0 | | | | |
| Number of roots: | | | | |
| 5K,C | 300,C | 1,250,C | 12K,C | C,C |
| 43.8 | 33.8 | 32.1 | 26.3 | 22.8 |
| Number of tillers: | | | | |
| 5K,C | 300,C | 1,250,C | 12K,C | C,C |
| 10.1 | 7.6 | 7.5 | 6.5 | 5.5 |
| Fresh wt. roots, g.: | | | | |
| 5K,C | 300,C | 1,250,C | 12K,C | C,C |
| 4.8 | 3.4 | 2.7 | 2.4 | 2.1 |
| Dry wt. roots, g.: | | | | |
| 5K,C | 300,C | 1,250,C | 12K,C | C,C |
| 0.44 | 0.36 | 0.30 | 0.25 | 0.16 |
| Fresh wt. tops, g.: | | | | |
| 5K,C | 300,C | 1,250,C | 12K,C | C,C |
| 11.9 | 9.2 | 7.8 | 6.0 | 4.9 |
| Dry wt. tops, g.: | | | | |
| 5K,C | 300,C | 1,250,C | 12K,C | C,C |
| 1.94 | 1.53 | 1.27 | 0.94 | 0.84 |

TABLE IX

| Species | Treatment | Total Fresh Weight of Plants g |
|---|---|---|
| Chinook Orchard Grass | C,C | 311 |
| | 5K,C | 762 |
| | 12K,C | 218 |
| Frontier Reed Canary Grass | C,C | 1228 |
| | 5K,C | 2208 |
| | 12K,C | 2457 |
| Vernal Alfalfa | C,C | 2612 |
| | 5K,C | 3701 |
| | 12K,C | 3452 |

It can be seen that the total weight of Chinook orchard grass grown from seeds exposed to 5 kc/s sound was 2.5 times that of the controls. That of the plants grown from seeds exposed to 12 kc/s sound was, however, only 70 per cent that of the controls. The total fresh weights of frontier reed canary grass grown from seeds exposed to either frequency were double those of the controls, while fresh weights of vernal alfalfa were approximately 1.4 times those of the controls.

Fresh weights of the second year's growth of frontier reed canary grass and vernal alfalfa are shown by the following tables:

TABLE X

Fresh Weight (g/row) of Frontier Reed Canary Grass

| Plot | Cut | C | Sound Treatment 5K | 12K |
|---|---|---|---|---|
| Fertilized | 1 | 930 | 1129 | 1151 |
| | 2 | 366 | 360 | 244 |
| | Total | 1296 | 1489 | 1395 |
| Unfertilized | 1 | 527 | 1043 | 771 |
| | 2 | 181 | 255 | 204 |
| | Total | 703 | 1298 | 975 |

TABLE XI

Fresh Weight (g/row) of Vernal Alfalfa

| Plot | Cut | C | Sound Treatment 5K | 12K |
|---|---|---|---|---|
| Fertilized | 1 | 1826 | 1675 | 1755 |
| | 2 | 716 | 693 | 649 |
| | 3 | 582 | 508 | 569 |
| | Total | 3124 | 2876 | 2973 |
| Unfertilized | 1 | 817 | 884 | 782 |
| | 2 | 771 | 757 | 680 |
| | 3 | 391 | 522 | 400 |
| | Total | 1979 | 2163 | 1862 |

The weight of the first cut of frontier reed canary grass, grown in the fertilized plants of seeds exposed to either 5 kc/s or 12 kc/s sound frequencies was 20 per cent larger than that of control plants. This increment was not apparent in the second cut. However, the weight of plants grown from 5 kc/s exposed seeds in the unfertilized plots was double that of the controls in the first cut and 1.5 times that of the controls in the second cut. Weights of plants grown from 12 kc/s exposed seeds were 1.5 times that of controls in the first cut and 1.1 times that of the controls in the second cut. It appears, therefore, that stimulation of plant growth by exposure to 5 kc/s sound is apparent in the second year's growth only in unfertilized plants. The total fresh weight of clippings in the 5 kc/s unfertilized plot is comparable with that of the clippings of the control unfertilized plot.

The present invention further contemplates the use of sound frequencies over a much wider range than indicated above. Use of frequencies from the sub-audible to the highest of the audible is contemplated. Further, the use of a single frequency is not essential. A series of frequencies may be used in the same treatment, either sequential or discrete, or "swept" over a range.

The effect of some vocal and instrumental music on the growth of selected plant species has also been studied wherein all six of the tunes shown in Table XII below were used for the germination studies, while only tunes II and VI were used for the growth studies.

TABLE XII

| Tune No. | Type | Cycles per Second (Approx.) |
| --- | --- | --- |
| I | Male Choir | 50 — 1000 |
| II | Female Solo | 250 — 1800 |
| III | Vocal | |
| IV | Vocal | |
| V | Saduccai Pipes | 300 — 800 |
| VI | Flute, Sopilka | 300 — 2000 |

The specification incantation songs of the type associated with each tune number were each related to various agrarian practices as noted by some of the early records of ethnic and folklore culture. The approximate power density ranges are shown in connection with all but the vocal types. With the use of carefully controlled and replicated experiments, it can be demonstrated that "agrarian" ethnic music, vocal or instrumental, has a significant effect on plant development.

The tapes of the various types of tunes, of the type shown in Table XII, were replayed on a tape recorder and the sound delivered into growth cabinets by 6-inch speakers.

The seeds of eight plant species were allowed to germinate at 25 ±1°C in dark cabinets and were, except for the control group, exposed to sound treatment. For each treatment, petri dishes (8 cm diam.) were used containing 25 morphologically comparable seeds per dish. The experiments were carried out in triplicate and, therefore, for each plant species, a minimum total of 300 seeds was used for each tune, as well as for the control (no sound). Sufficient water was added for the seeds to float (i.e., water was not a limiting factor).

The eight plant species used were as follows: (Amounts of water per 8.0 cm petri dish are given in parentheses)

Alfalfa (10 ml), Bean-Pencil Pod (20 ml), Corn-Cross Bantam (20 ml), Cucumber-Straight (10 ml), Flax (10 ml), Lettuce-Grand Rapids (7 ml), Oats-Russell (10 ml), Pea-Creamette (15 ml).

Different batches of each species were allowed to germinate for 48 hours and, but for the controls, respectively exposed for 12-hour periods to tunes I, II, III, IV and VI. Tunes I and V were played continuously. Music and control cabinets were rotated with each repetition of the experiment in order to eliminate any cabinet effect.

Each hour, the percentage germination of the sound-treated and control seeds was noted. Germination was assessed to have taken place when the root pierced the seed coat.

Observations were made using a binocular-dissecting microscope at a magnification of 100 X.

The data were subjected to statistical analysis using Scheffe's test at a 5 per cent level. Data not significantly different are shown underscored by the same lines. Conventionally, the results are ordered by decreasing magnitude.

In no case was a clearly significant stimulation of germination obtained. Only Bean and Corn showed an indication that some tunes might affect the rate of germination, and these results are shown in Table

TABLE XIII

Percent germination of control and sound exposed seeds (Roman numerals refer to tunes)

| Species | Time (hr.) | Percent germination | | | | | | |
| --- | --- | --- | --- | --- | --- | --- | --- | --- |
| Bean | 18 | II 21 | VI 18 | I 12 | III 12 | C 11 | IV 10 | V 10 | Ia 9 |
| | 24 | I 57 | II 53 | VI 44 | C 44 | IV 43 | III 32 | V 29 | Ia 27 |
| | 30 | I 77 | VI 76 | IV 72 | C 71 | II 66 | Ia 59 | III 59 | V 54 |
| Corn | 16 | II 36 | VI 35 | V 28 | C 26 | I 23 | III 21 | IV 19 | Ia 19 |
| | 18 | II 52 | VI 44 | C 41 | V 40 | I 36 | Ia 35 | III 33 | IV 29 |

*C—control   Ia—continuous exposure to tune I.

The tunes which appear to most consistently affect germination, even though the effect was not clearly significant, were the two vocal pieces, I and II, and the instrumental tune VI. Tunes II and VI seemed to have slight influence on the rate of germination, and these were used in the growth studies.

Seeds (10 per dish) of corn, cucumber and oats were germinated as described above. During the germination, and the subsequent 8-week plant growth period, each species was exposed for 8 hours per day, 5 days weekly, to the same tune. Tunes I and VI were used in parallel experiments. Control batches were grown in comparable cabinets in which there was no cound except the background machinery noise. The experiments were replicated five times, thus requiring a total of 50 plants of each species. When over 80 per cent of the seedling roots in any group reached 3 cm in length, they were planted in peat pots filled with sterilized loam soil. The soil for all the experiments was obtained from one source and bagged at the same time.

Pots were watered as required to keep the soil-moisture content to field capacity. A regime of 16-hour day and 8-hour night was maintained in all cabinets.

The total light intensity during the daytime was 1,500–1,700 ft c and provided by four 25-watt incandescent and eight fluorescent light bulbs. A constant temperature of 24 ±1°C was maintained.

Fresh and dry weights of "tops," number of leaves, height of plants, and number of emergent buds and flowers were assessed at the end of each 8-week growth period. Dry weights were obtained after the plant material was heated to 95 ±1°C for 24 hours and then equilibrated with atmospheric humidity.

Table XIV below shows the growth parameter values for variously treated cucumber plants.

TABLE XIV

Cucumber var. straight, after 8 weeks growth (Scheffe's test, 5 percent level).

|  | VI | II | C* |
|---|---|---|---|
| Height, cm. | 51.0 | 26.1 | 25.4 |
|  | VI | C | II |
| Wet wt. tops, g. | 12.7 | 6.9 | 5.8 |
|  | VI | C | II |
| Dry wt. tops, g. | 1.0 | 0.6 | 0.5 |
|  | VI | II | C |
| Number of buds | 61.3 | 31.7 | 20.2 |
|  | VI | C | II |
| Number of leaves | 18.7 | 11.2 | 10.8 |

*C - Control

It can be seen that the flute melody VI evoked a twofold increase in the overall height and weight (wet and dry) of the "tops" of the cucumber plant. Three times the number of buds were present when the plants were exposed to this tune and a significant increase in the number of leaves was also observed. Plants exposed to song II did not differ in growth parameter from the control except for the number of buds, which increased by 50 per cent.

The wet weight of the tops of corn was the only parameter significantly affected by sound treatment (tune VI), and in this case only a slight (approximately 15 per cent) increase over control was observed. See Table XV below.

TABLE XV

Corn var. Cross Bantam after 8 weeks growth (Scheffe's test, 5 percent level)

|  | VI | C* | II |
|---|---|---|---|
| Height, cm. | 82.9 | 78.9 | 78.6 |
|  | VI | II | C |
| Wet wt. tops, g. | 17.2 | 15.1 | 13.9 |
|  | VI | C | II |
| Dry wt. tops, g. | 1.7 | 1.5 | 1.4 |
|  | VI | C | II |
| No. of leaves | 8.4 | 7.8 | 7.5 |

*C-control

The data for oats in Table XVI below show that the overall height of the sound-exposed oat plants was enhanced by exposure to both the instrumental and vocal selections. However, the wet weight of the "tops" was only significantly increased by exposure to the flute. No other growth parameters changed with sound exposure.

TABLE XVI

Oats var. Russell after 8 weeks growth (Scheffe's test, 5 percent level)

|  | VI | II | C* |
|---|---|---|---|
| Height, cm. | 76 | 70.3 | 66.5 |
|  | VI | II | C |
| Wet wt. tops, g. | 43.9 | 37.3 | 36.4 |
|  | VI | C | II |
| Dry wt. tops, g. | 0.5 | 0.5 | 0.4 |
|  | C | II | VI |
| No. of leaves | 9.6 | 9.2 | 9.0 |
|  | C | II | VI |
| No. of tillers | 2.7 | 2.0 | 1.9 |

*C - control

From the above study, it can be seen that a striking increase in the overall growth of cucumber plants was obtained when they were exposed to the Sopilka Flute melody (Tune VI). This melody was also beneficial for oats, and in some cases stimulated the leafy growth of corn plants to an unusual degree, even though this was not too apparent in the statistical analysis of the results. Tune II, although less effective, stimulated bud development in cucumber and height and wet weight of oats.

With respect to the ultra-sound aspect of the invention, dry seeds are used generally without chilling. Such seeds (grains) were placed in water-tight plastic bags and placed in an ultra-sound tank, generating a frequency of 25 kc/s at a power output on the base plate of 0.2—0.5 watts/cm$^2$. The characteristics of the tank used required that water be placed in them to prevent overheating of the device. The seeds to be sonic treated were placed in impermeable bags to prevent imbibition during treatment. Statistically significant-sized seed populations were used in all cases and this was established using the coefficient of variation for each seed type. The tanks were housed in cold chambers during treatment so that the temperature of the contained water would be maintained with the physiologically acceptable range during treatment, i.e., slightly above freezing initially (2°—10°C), and to prevent temperature rising above 35°C during the more prolonged treatment periods.

Alfalfa, lettuce and corn seeds were treated from 1 minute to 48 hours. The data presented below represents the most significant response at each of the stated time periods following growth, either in the field or in controlled growth chambers (8-inch pots, loam soil), temperatures of 24°±1°C and 18°±1°C (day and night) and 1,800 foot-candles light.

TABLE XVII

Alfalfa seeds (grains) wet weight, 94-days growth under controlled environment conditions.

| Seed Treatment for | Wet wt. tops (g) | Dry wt. tops (g) |
|---|---|---|
| 25K, 20 min. for | 1.07 ±0.2 | 0.3 ±0.06 |
| 25K, 24 hrs. | 0.82 ±0.13 | 0.2 ±0.4 |
| Control, non-treated | 0.7 ±0.2 | 0.2 ±0.3 |

Applying Scheffe's test at the 5 per cent level with respect to the wet (fresh) weights, the following relationship was obtained:

TABLE XVIII

Change in fresh wt. with time of prior seed sonication

|  | 25K(20 min.) | 25K(24 hr.) | Control |
|---|---|---|---|
| Fresh wt., gm. | 1.07 | 0.82 | 0.7 |
| Dry wt., gm. | 0.3 | 0.2 | 0.2 |

A significant increase in both fresh and dry weights was obtained in 94-day old plants derived from alfalfa seed sonically exposed to 25 kc/s. 24 hours' exposure of seeds to 25 kc/s resulted in a significant (approximately 12 per cent) increase in fresh weights alone.

Lettuce seeds were ultimately stimulated when exposed to 10-20 minutes ultra-sound (25 kc/s). No significant decrease was found between these two periods of sonication. Increase in the diameter, fresh and dry weights, of the lettuce derived from such treated seed were noted at three growth periods spanning 44—90 days' growth. The effect of exposing lettuce seeds to 25 kc/s for varying periods of time (1 minute to 48 hours) is shown in the following table:

TABLE XIX

| Time, min | 20 | 10 | 60 | 1 | 120 | 5 | 240 | 1,440 Cont. (24 h) | 48 |
|---|---|---|---|---|---|---|---|---|---|
| Fresh wt., tops, gm | 38 | 34 | 29 | 29 | 29 | 29 | 27 | 20   18 | 10 |
| Time, min | 10 | 20 | 5 Cont. | 1 | 60 | 120 | 240 | 1,440 | 48 |
| Dry wt., tops, gm | 3.5 | 3.2 | 1.9 | 1.7 | 1.4 | 1.4 | 1.4 | 1.4   1.2 | 0.7 |

Cont.=Control.  h=hour.

There was no significant difference between 10 or 20 minutes of seed exposure to 25 kc/s. As the date in Table XIX illustrates, periods of exposure above or below this level were either suboptimal or supra-optimal.

It should be noted that the ultra-sound frequency may, if desired, be generated by a piezo crystal which may be a piezoceramic crystal. The required vibrations may be generated by such piezoceramic crystal firmly attached to the bottom of the seed container. With such ultra-sound immersion of the seeds (carried out typically above freezing and below boiling temperatures), vastly improved growth characteristics result.

From the foregoing, it can be seen that the methods used in accordance with the present invention present significant results in relation to seed and crop improvement. The importance to ordinary agriculture, and even more significantly to the agriculture of underdeveloped countries, is obvious.

What is claimed is:

1. A method for improving the growth characteristics of plant material selected from the cereal group consisting of Rideau winter wheat and Marquis spring wheat, including:
    soaking said plant material in water until they have taken up all the water they can absorb;
    subjecting said soaked plant material to a temperature of about 2°C.; and
    further subjecting said plant material for a period of about 4 weeks to sound vibrations in the frequency range of at least one of about 5,000 and 12,000 cycles per second at an intensity level of about 92—95 db re 0.0002 dynes/cm$^2$.

2. A method for improving the growth characteristics of forage crops selected from the group consisting of vernal alfalfa, orchard grass, and reed canary grass, including:
    soaking the grains of said forage crops in water until they have taken up water of about 12 per cent of the dry weight thereof;
    subjecting said grains of said forage crops to a temperature of about 2° C. for completely germinating said grains; and
    further subjecting said grains of said forage crops for a period of about 4 weeks to sound vibrations in the frequency range of at least one of about 5,000 and 12,000 cycles per second at an intensity level of about 92 to 95 db re 0.0002 dynes /cm$^2$.

3. A method of improving the growth characteristics of grains selected from the group consisting of alfalfa, bean, corn, flax, lettuce, oats, and pea, including:
    soaking said grains in water until they have taken up all the water they can absorb;
    subjecting said grains to a continuous swept frequency range of about 300—2000 cycles per second;
    germinating said grains at a temperature of about 25°C for about 48 hours while subjecting said grains to said swept frequency range;
    transferring said grains to a growing medium; and
    permitting said grains to grow in said growing medium for a period of eight weeks while subjecting said grains to said swept frequency range.

4. A method of improving the growth characteristics of grains selected from the group consisting of alfalfa, lettuce and corn, including:
    subjecting said grains to an ultra-sound frequency range of 25,000 cycles per second of a power output of about 0.2—0.5 watts/cm$^2$ for a period of between 10 and 20 minutes.

* * * * *